United States Patent
Tufano et al.

(10) Patent No.: US 12,083,710 B2
(45) Date of Patent: Sep. 10, 2024

(54) PELLET COMPRISING AN AXIAL CORE AND A POLYMER SHEATH, AND ITS MANUFACTURE

(71) Applicant: SABIC GLOBAL TECHNOLOGIES B.V., Bergen Op Zoom (NL)

(72) Inventors: Carmela Tufano, Geleen (NL); Zahra Fahimi, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 1118 days.

(21) Appl. No.: 16/469,944

(22) PCT Filed: Dec. 14, 2017

(86) PCT No.: PCT/EP2017/082915
§ 371 (c)(1),
(2) Date: Jun. 14, 2019

(87) PCT Pub. No.: WO2018/109118
PCT Pub. Date: Jun. 21, 2018

(65) Prior Publication Data
US 2020/0078988 A1 Mar. 12, 2020

(30) Foreign Application Priority Data
Dec. 15, 2016 (EP) .................... 16204286

(51) Int. Cl.
*B29B 9/14* (2006.01)
*B29B 9/06* (2006.01)
*B29B 15/12* (2006.01)
*B29C 48/00* (2019.01)
*B29C 48/05* (2019.01)
*B29C 48/09* (2019.01)
*B29L 31/30* (2006.01)

(52) U.S. Cl.
CPC .............. *B29B 9/14* (2013.01); *B29B 9/06* (2013.01); *B29B 15/122* (2013.01); *B29C 48/0022* (2019.02); *B29C 48/05* (2019.02); *B29C 48/09* (2019.02); *B29L 2031/3041* (2013.01); *Y10T 428/2929* (2015.01)

(58) Field of Classification Search
None
See application file for complete search history.

(56) References Cited

U.S. PATENT DOCUMENTS

| | | | |
|---|---|---|---|
| 4,338,233 A | 7/1982 | Das et al. | |
| 6,291,064 B1 | 9/2001 | Kadowaki et al. | |
| 2005/0238864 A1 | 10/2005 | D'Souza et al. | |
| 2015/0239153 A1 | 8/2015 | Biemond et al. | |
| 2016/0193760 A1 | 7/2016 | Biemond et al. | |
| 2016/0272770 A1 | 9/2016 | Tufano et al. | |
| 2016/0346957 A1 | 12/2016 | Biemond et al. | |

FOREIGN PATENT DOCUMENTS

| | | | |
|---|---|---|---|
| CN | 103502357 | * | 1/2014 |
| EP | 0206189 A1 | | 12/1986 |
| EP | 0335186 A2 | | 10/1989 |
| EP | 1460166 A1 | | 9/2004 |
| JP | 2013538176 | * | 10/2013 |
| WO | 2009080281 A1 | | 7/2009 |
| WO | 2016062569 A1 | | 4/2016 |
| WO | 2016065614 A1 | | 5/2016 |
| WO | 2016091686 A1 | | 6/2016 |

OTHER PUBLICATIONS

Machine translation of JP2013538176 (Year: 2013).*
Machine translation of CN103502357 (Year: 2014).*
International Search Report; International Application No. PCT/EP2017/082915; International Filing Date: Dec. 14, 2017; Date of Mailing: Mar. 6, 2018; 5 pages.
Written Opinion; International Application No. PCT/EP2017/082915; International Filing Date: Dec. 14, 2017; Date of Mailing: Mar. 6, 2018; 7 pages.

* cited by examiner

*Primary Examiner* — Shawn Mckinnon
(74) *Attorney, Agent, or Firm* — CANTOR COLBURN LLP

(57) ABSTRACT

Pellet having an axial direction and comprising a core that extends in the axial direction and further comprising a polymer sheath applied around said core, wherein said core comprises a plurality of filaments that extend in the axial direction; said polymer sheath is at least substantially free of said filaments; said polymer sheath comprising a plurality of filler particles; said pellet comprises at least 30%, preferably at least 35%, more preferably at least 40%, and preferably at most 60%, preferably at most 50%, of filaments by weight of the total weight of said pellet. Further disclosed is a reinforced article obtained from molding a plurality of said pellets, and a method of making such a pellet.

21 Claims, No Drawings

PELLET COMPRISING AN AXIAL CORE AND A POLYMER SHEATH, AND ITS MANUFACTURE

CROSS REFERENCE TO RELATED APPLICATIONS

This application is a 371 of International Application No. PCT/EP2017/082915, filed Dec. 14, 2017, which is incorporated by reference in its entirety, and which claims priority to European Application Serial No. 16204286.5, filed Dec. 15, 2016.

The invention relates to a process for the preparation of a pellet, a reinforced article and to a method of making a pellet.

Introduced more than half a century ago, fiber-reinforced plastics are composite materials with a wide range of applications in industry, for example in the aerospace, automotive, chipping, building and construction industries. A reinforced article can comprise any combination of individual materials, for example a thermoplastic polymer (the matrix) in which fibers (reinforcing fiber) have been dispersed. A great diversity of organic fibers, including synthetic fibers such as polyamide, polytetrafluoroethylene, polyesters, natural fibers such as cotton, hemp, flax, jute and inorganic fibers, such as glass fibers and carbon fibers are often used as reinforcing fibers in composite materials.

The reinforced plastics industry has been using glass fibers in different forms for reinforcing polymer matrices to produce a diversity of products. Glass fibers are generally supplied as a plurality of continuous, very long filaments, and can be in the form of strands or bundles, rovings or yarns. A filament is an individual fiber of reinforcing material. A bundle is a plurality of bundled filaments. Yarns are collections of filaments or bundles twisted together. A roving refers to a collection of bundles/strands wound into a package.

A process for producing reinforced compositions is for example described in WO2009/080281. In this publication a process is described for producing a long glass fiber-reinforced thermoplastic polymer composition, which comprises the subsequent steps of:
 a. Unwinding from a package of at least one continuous glass multifilament strand containing a sizing composition;
 b. Applying an impregnating agent to said at least one continuous glass multifilament strand to form an impregnated continuous multifilament strand;
 c. Applying a sheath of thermoplastic polymer around the impregnated continuous multifilament strand to form a sheathed continuous multifilament strand; and
 d. Cutting the sheathed continuous glass multifilament strand into pellets.

The pellets that are obtained with the above-described process comprise a multifilament glass (strand) that has the same length as the pellet. When these pellets are molded into an article the stiffness of the article is not sufficient for all applications. The stiffness of an article can be improved by raising the amount of glass fibers in the article. However, pellets which contain a higher amount than 50 wt. % of glass fibers are difficult to be used in injection molding processes. Moreover with increasing glass fiber content the density of the final part will increase which is not always desirable in particular not in the automotive industry.

International application WO2016/062569 A1 of the present applicant relates to a method of transporting pellets of a glass fibre reinforced thermoplastic polymer composition from a loading position to an unloading position.

International application WO206/091686 A1 of the present applicant relates to a process for the manufacture of long glass fibre reinforced polypropylene compositions containing from 10-70 wt. % of glass fibers based on the weight of the composition.

It is an object of the present invention to provide a pellet for use in a process for the preparation of a reinforced article with decreased density while maintaining a good stiffness. In other words, it is an object of the present invention to increase the stiffness of an article while keeping the density the same or decreasing the weight of an article and keeping a similar stiffness. One or more of these objects are achieved by the invention as discussed in the appended claims.

SUMMARY

In a first aspect, the present invention relates to a pellet having an axial direction; said pellet comprising a core that extends in the axial direction and comprising a polymer sheath which has been applied around said core, wherein said core comprises a plurality of filaments, preferably glass filaments, that extends in the axial direction; wherein said polymer sheath is at least substantially free of said (glass) filaments and wherein said polymer sheath comprising a plurality of filler particles; wherein said pellet comprises at least 30%, preferably at least 35%, more preferably at least 40%, and preferably at most 60%, preferably at most 50%, of (glass) filaments by weight of the total weight of said pellet.

In a second aspect, the present invention relates to a solid object obtained from molding a plurality of said pellets according to the invention.

In a third aspect, the present invention relates to a method of preparing a pellet comprising the steps of:
 i) unwinding from a package of a plurality of continuous (glass) filaments;
 ii) optionally applying a impregnating composition to said plurality of (glass) filaments to form an impregnated plurality of (glass) filaments;
 iii) providing a polymer composition comprising at least one polymer and a plurality of filler particles;
 iv) applying a sheath of polymer comprising filler particles around the plurality of (glass) filaments to form a sheathed bundle comprising a core comprising said plurality of (glass) filaments and comprising a sheath comprising said polymer and filler particles: and
 v) cutting the sheathed bundle into individual pellets comprising a core that extends in the axial direction and comprising a polymer sheath which has been applied around said core, wherein said polymer sheath is at least substantially free of said (glass) filaments and wherein said polymer sheath comprising a plurality of filler particles; wherein said pellet comprises at least 30%, preferably at least 35%, more preferably at least 40%, and preferably at most 60%, preferably at most 50%, of (glass) filaments by weight of the total weight of said pellet.

Definitions

In the present description composite means: comprising at least two individual materials. The pellet according to the present invention may be regarded as being a composite pellet.

In the present description pellet means: a rounded or tube-like solid object, such as a compressed mass of a substance.

In the present description glass bubble means: a hollow glass microsphere comprised of a glass wall and an inner void. A plurality of glass bubbles may however comprise a certain volume of at most 20 wt. %, preferably at most 15 wt. %, more preferably at most 10 wt. % of solid glass particles.

In the present description filament means: a thin thread or thread-like object or fiber.

In the present description glass filament means: a filament made of glass.

In the present description multifilament means: a plurality of filaments, e.g. in the form of a strand or bundle.

In the present description bundle means: a plurality of filaments that is held together or wrapper up together.

In the present description clay means: a granular silicate mineral material; a natural product.

In the present description nanoclay means: nanoparticles of a clay; viz. nanoparticles of a (layered) mineral silicates.

In the present description sepiolite clay means: a specific type of clay, being a complex magnesium silicate, a typical chemical formula for which is $Mg_4Si_6O_{15}(OH)$.

DETAILED DESCRIPTION OF THE INVENTION

As discussed above, in a first aspect, the present invention relates to a pellet having an axial direction; said pellet comprising a core that extends in the axial direction and comprising a polymer sheath which has been applied around said core, wherein: * said core comprises a plurality of (glass) filaments that extends in the axial direction; * said polymer sheath is at least substantially free of said filaments; * said polymer sheath comprising a plurality of filler particles; * said pellet comprises at least 30%, preferably at least 35%, more preferably at least 40%, and preferably at most 60%, preferably at most 50%, of filaments by weight of the total weight of said pellet. In other words, it relates to a pellet comprising a glass filament core surrounded by a filler-comprising polymer sheath. This pellet may be used to prepare reinforced articles.

The filler has a positive effect on the strength/stiffness of the reinforced articles. The filler is preferably a low weight filler that reduced the weight of the reinforced article while keeping the same strength/stiffness or improving these.

In an embodiment, the present invention relates to a pellet having an axial direction; said pellet consisting of a core that extends in the axial direction and a polymer sheath which has been applied around said core, wherein: * said core consists of a plurality of (impregnated) (glass) filaments that extends in the axial direction; * said polymer sheath is at least substantially free of said filaments; * said polymer sheath comprising a plurality of filler particles; * said pellet comprises at least 30%, preferably at least 35%, more preferably at least 40%, and preferably at most 60%, preferably at most 50%, of filaments by weight of the total weight of said pellet.

The pellet according to the invention has at least two fillers, the first filler being the filaments forming the core of said pellet and the second filler being the filler particles that are present in the polymeric sheath.

The pellet comprises at least 30%, preferably at least 35%, more preferably at least 40%, and preferably at most 60%, preferably at most 50%, of filaments of the core by weight of the total weight of said pellet. This allows sufficient strength to be present in the reinforced article prepared from said pellet. It is known that by increasing the amount of glass filament in the core, the strength will increase as will the weight of the pellet.

It has been unexpectedly found that the ratio of tensile modulus over density of fiber-reinforced pellets of thermoplastic resins can be significantly reduced by filling the polymer sheath with a particulate filler e.g. hollow glass bubbles or microspheres or by nanoclay or a combination thereof; substantially without significantly reducing the tensile strength and other physical properties of the pellet. As a result, (glass) fiber filament-reinforced thermoplastic pellets may be made in lighter yet desirably robust form. The invention can be used to make composite materials for use in a variety of structural applications, e.g., as parts for use in motor vehicles.

The pellet used in the present invention has a generally cylindrical shape having an axial length, i.e. the length in the direction perpendicular to the cross section of the cylinder. The core of the pellet has a generally cylindrical shape and comprises a multifilament (bundle) made of (glass) fibers optionally impregnated with an impregnating agent. The fibers have a length substantially equal to the axial length of the pellet. The core of the pellet is surrounded around its circumference by a sheath having a generally tubular shape comprising a thermoplastic polymer and a filler.

For the avoidance of doubt it should be understood that the pellet has a core sheath structure wherein the core comprises the optional impregnating agent and the glass multifilament. The sheath consists of the thermoplastic material including the filler and surrounds the core. The core (glass filament) does not substantially contains the material of the sheath. And the sheath is substantially free of filaments. Such a pellet structure is obtainable by a wire-coating process such as for example disclosed in WO 2009/080281 and is distinct from the pellet structure that is obtained via the typical pultrusion type of processes such as disclosed in U.S. Pat. No. 6,291,064.

In an embodiment of the first aspect, said filler particles that are present in the polymer sheath are glass bubbles, preferably having an average diameter of between 10 and 30 micrometer, preferably between 15 and 25 micrometer. These glass bubbles are discussed in more detail below.

In an embodiment of the first aspect, said filler particles that are present in the polymer sheath are clay particles, preferably nanoclay particles, preferably a sepiolite clay. These nanoclay particles are discussed in more detail below. In an embodiment of the first aspect, the filler particles that are present in the polymer sheath are a combination of glass bubbles and nanoclay particles. In an embodiment of the first aspect, said pellet comprises between 3 and 20 wt. % of said filler particles in the polymeric sheath, preferably between 5 and 10 wt. % of basis of the total weight of the pellet.

In the embodiment wherein a combination of glass bubbles and nanoclay particles is used, this percentage relates to the combination of both filler particles. In an embodiment of the first aspect, the weight ratio between glass bubbles and nanoclay particles is between 0.5 to 2.0.

In an embodiment of the first aspect, said plurality of filaments is a continuous, multifilament glass. In an embodiment of the first aspect, said plurality of filaments preferably comprise from 2000 to 5000 filaments. In an embodiment of the first aspect, said filaments preferably each individually having a diameter from 5 to 50 microns, more preferably from 10 to 30 microns and most preferably from 15 to 25 microns. Preferably, said filaments each have substantially the same diameter, e.g. where at least 90% of all filaments forming said multifilament have a diameter that is within a range +10% and −10% from an average diameter. In an embodiment of the first aspect, said filaments preferably having an average diameter (mathematical average of all filaments) from 5 to 50 microns, more preferably from 10 to 30 microns and most preferably from 15 to 25 microns In an embodiment of the first aspect, said polymer sheath is prepared of a polyolefin material, preferably a polypropylene, more preferably a polypropylene homopolymer, more preferably having a melt flow index (MFI) that is at least 20 g/10 min and/or having a MFI that is at most 150 g/10 min, most preferably in the range of 30 to 80 g/10 min.

In an embodiment of the first aspect, the amount of polymer in the pellet is between 40 and 80 wt. % of the total weight of the pellet. In an embodiment of the first aspect, the exposed ratio (the number of filaments that is (visually) observed at the cutting edge of the pellet divided by the total number of filaments times 100%) is at least 95%. In an embodiment of the first aspect, the filler particles are glass bubbles and the glass bubble breakage is at most 30%, preferably at most 23%. In an embodiment of the first aspect, the polymer sheath comprises less than 5 wt. % of filament, preferably less than 2 wt. % of filament based on the total weight of the polymer sheath. This is meant with substantially free of filament.

In an embodiment of the first aspect, the core comprises between 35 and 60% of the cross section area of the pellet and wherein the sheath comprises between 40 and 65% of the cross section area of the pellet. In order to determine this the cross section area of the pellet is determined and separately the cross section area of the filament core is determined. The difference between the two values is the cross section area of the polymer sheath.

Preferably, the longitudinal variation in the radius of the core over the length of the pellet in view of the average radius is between −5% and +5%. Preferably, the variation in the radius of the core from one individual pellet to another individual pellet in view of the average radius is between −5% and +5%. When in the description radius of the core is disclosed, average radius over the length as well as the average radius over several individual pellets is meant unless specified otherwise.

Preferably, the longitudinal variation in the diameter of the pellet over the length of the pellet in view of the average diameter is between −5% and +5%. Preferably, the variation in the diameter of the core from one individual pellet to another individual pellet in view of the average diameter is between −5% and +5%. When in the description diameter of the pellet is disclosed, average diameter over the length as well as the average diameter over several individual pellets is meant unless specified otherwise. Without wishing to be bound to any particular theory, the present inventors assume that due to the cutting step in the production of said pellets, the diameter and shape of one or both ends of said pellet may show a variation with respect to the center of said pellet.

In an embodiment of the first aspect, the radius of the core is between 800 and 4000 micrometer and wherein the thickness of the sheath is between 500 and 1500 micrometer It should be noted that when during the manufacturing process to prepare the inventive pellets maximally 2% of all pellets formed have an incompletely closed polymer sheath leading to pellets that have exposed filaments over the axial length—this is called the Zebra effect. There is no need to separate these Zebra-pellets from the pellets with completely closed polymer sheaths even though these Zebra-pellets are not pellets according to the present invention.

In an embodiment of the second aspect, the fiber-filament reinforced object formed of the present pellets has an isotropic modulus of at least 5000 MPA, preferably at least 5500 MPA, more preferably at least 6000 MPA. In an embodiment of the second aspect, the fiber-filament reinforced object formed of the present pellets has an effective isotropic modulus of between 3.5 and 7 $(m/s)^2$, preferably 4 to 6 $(m/s)^2$, more preferably 4.5 to 5.5 $(m/s)^2$. In an embodiment of the second aspect, the fiber-filament reinforced object formed of the present pellets has a density of at most 1.3, preferably 1.28, more preferably 1.25.

In an embodiment of the third aspect, during the process to produce the present pellets, the mixture of polymer and filler particles is applied to said plurality of filaments by a wire-coating process as discussed above.

Filaments

Multifilament bundles (preferably glass multifilament bundles) and their preparation are known in the art. The fibers, preferably glass fibers, in the bundles may have been formed by any method known to those skilled in the art. Particularly, the fibers may have been formed by a melt spinning process. The length of the fibers in the bundle is determined by the length of the pellet and may vary in a wide range. For example the average length of the filaments in the pellet may vary between 10 to 50 mm, preferably between 10-25 mm, more preferably between 10-20 mm. The average length of the filaments in the object formed from the pellets is less than the average length of the filaments in the pellet due to breakage of the filaments because of mechanical forces during production of said objects.

The fiber density of the fibers in the bundle may vary within wide limits. Preferably, the bundle may have from 500 to 10000 fibers/bundle and more preferably from 2000 to 5000 fibers/bundle. The diameter of the fibers in the bundle may widely vary. Preferably, the diameter of the fibers in the bundle ranges from 5 to 50 microns, more preferably from 10 to 30 microns and most preferably from 15 to 25 microns. Fiber diameters outside these ranges tend to result in a decrease of mechanical properties and/or enhanced abrasion of the equipment used. The diameter of the multifilament bundle in the pellet may e.g. be between 1 and 7 mm.

The multifilament bundle may comprise a sizing composition. Suitable examples of conventional sizing compositions include solvent-based compositions, such as an organic material dissolved in aqueous solutions or dispersed in water and melt- or radiation cure-based compositions. More particularly, an aqueous sizing composition is applied on the individual fibers, but also oil-based sizing compositions can be applied. As already described in the art, e.g. in documents EP1460166A1, EP0206189A1 or U.S. Pat. No. 4,338,233, an aqueous sizing composition typically includes film formers, coupling agents and other additional components. The film formers are generally present in effective amount to protect fibers from inter-filament abrasion and to provide integrity and processability for fiber bundles after they are dried. Suitable examples of film formers generally include polyurethanes, polyesters, such as polycaprolactone, polyolefins, such as polypropylene, polyamides. It is already recognized in the art that the film former should be miscible with the polymer to be reinforced. For example, polycaprolactone may be used as film former when nylon is used as polymer to be reinforced; for reinforcing polypropylenes, suitable film formers generally comprise polyolefin waxes.

Coupling agents (in the sizing composition) are generally used to improve the adhesion between the matrix thermoplastic polymer and the fiber reinforcements. Suitable examples of coupling agents known in the art as being used for the fibers include organofunctional silanes. More particularly, the coupling agent which has been added to the sizing composition is an aminosilane, such as aminomethyl-trimethoxysilane, N-(beta-aminoethyl)-gamma-aminopropyl-trimethoxysilane, gamma-aminopropyl-trimethoxysilane gamma-methylaminopropyl-trimethoxysilane, delta-aminobutyl-triethoxysilane, 1,4-aminophenyl-trimethoxysilane. In a preferred embodiment of the process of the invention, fibers having a sizing composition containing an aminosilane are applied as multifilament bundle, to result in good adhesion to the matrix formed by the melted thermoplastic polymer of the sheath. Any other additional components known to the skilled person may be present in the sizing composition. Suitable examples include lubricants, used to prevent damage to the bundles by abrasion, antistatic agents, crosslinking agents, plasticizers, surfactants, nucleation agents, antioxidants, pigments and any combinations thereof. Applying a sizing composition to the formed filaments is well-known in the art.

Typically, after applying the sizing composition on the fibers, the fibers are bundled into bundle and then wound on bobbins to form a package. A multifilament bundle which contains at most 2 wt. % of a sizing composition based on the total weight of the fibers in the multifilament bundle is preferably employed in the pellets used in the process of the invention. The amount of the sizing composition can be determined by loss on ignition (LOI). The LOI is a well-known technique for determining the amount of sizing on fibers. More preferably, a multifilament bundle containing from 0.1 to 1 wt. % of sizing composition, as determined by loss on ignition (LOI) is used.

Preferably, bundle(s) comprising (glass) fibers on which a sizing composition has been applied as aqueous dispersion are employed in the pellet according to the invention. Sizing is usually a solvent based material that is applied on the surface of the fibers to improve production process of fibers; preferably more than 90% of the sizing composition is solvent which will be removed during a drying process.

Impregnating Agent

An impregnating agent is usually low molecular weight material that acts mainly as a lubricant and remains in the product during whole process. The impregnating agent that may be used in the process according to the present invention comprises at least one compound that is compatible with the thermoplastic polymer. The impregnating agent enables the enhanced dispersion of the fibers in the thermoplastic polymer matrix during the molding process.

The application temperature is chosen such that the desired viscosity range is obtained. For example, when the matrix is polypropylene, the application temperature of the impregnating agent can be from 15 to 200° C.

The amount of impregnating agent applied to the multifilament bundle comprising fibers depends on the thermoplastic matrix, on the size (diameter) and concentration of the fibers forming the bundle, and on type of sizing that is on the surface of the fibers. The pellet according to the invention may comprise 1-10 wt. % impregnating agent based on the weight of the fibers in the multifilament bundle in the pellet. The weight ratio between glass and impregnating agent is between 4 to 40, preferably 5 to 25 and most preferably 8 to 20. based on the weight of the fibers in the multifilament bundle in the pellet. The impregnating agent assists homogeneous dispersion of fibers in the thermoplastic polymer matrix during molding, but the amount should not be too high, because an excess of the amount of impregnating agent may negatively influence other properties of the articles. It is found that the lower the viscosity, the less impregnating agent can be applied. For instance, in case the thermoplastic matrix is polypropylene homopolymer with a melt index MFI of 25 to 65 g/10 min (230 degrees 0/2.16 kg) and the reinforcing filaments have a diameter of 19 micron, the impregnating agent is preferably applied to the multifilament bundle in an amount of from 2 to 10 wt. %. The amount of the impregnating agent is preferably 0.05-6 wt. % based on the total weight of the pellet.

The impregnating agent should be compatible with the thermoplastic polymer to be reinforced, and may even be soluble in said polymer. The skilled man can select suitable combinations based on general knowledge, and may also find such combinations in the art. Suitable examples of impregnating agents include low molar mass compounds, for example low molar mass or oligomeric polyurethanes, polyesters such as unsaturated polyesters, polycaprolactones, polyethyleneterephthalate, poly(alpha-olefins), such as branched polyethylenes and polypropylenes, polyamides, such as nylons, and other hydrocarbon resins. As a general rule, a polar thermoplastic polymer matrix requires the use of an impregnating agent containing polar functional groups; a non-polar polymer matrix involves using an impregnating agent having non-polar character, respectively. For example, for reinforcing a polyamide or polyester, the impregnating agent may comprise low molecular weight polyurethanes or polyesters, like a polycaprolactone. For reinforcing polypropylenes, the impregnating agent may comprise branched poly(alpha-olefins), such as polyethylene waxes, modified low molecular weight polypropylenes, mineral oils, such as, paraffin or silicon and any mixtures of these compounds. Preferably, the impregnating agent comprises a low molecular weight hydrocarbon compound, comprising e.g. a branched poly(alpha-olefin) and, more preferably, the impregnating agent comprises for at least 70 wt. %, or at least 80 or even 90 wt. % of a branched polyethylene wax. In the cases the thermoplastic polymer is polypropylene the wax is optionally mixed with for example from 10 to 80, preferably 20-70 wt. % of a hydrocarbon oil or wax, like a paraffin oil, to reach the desired viscosity level.

The impregnating agent is non-volatile, and substantially solvent-free. Being non-volatile means that the impregnating agent does not evaporate under the application and processing conditions applied; that is it has a boiling point or range higher than said processing temperatures. In the context of present application, "substantially solvent-free" means that impregnating agent contains less than 10 percent by mass of solvent, preferably less than 5 percent by mass solvent. Most preferably, the impregnating agent does not contain any organic solvent.

The impregnating agent may further be mixed with other additives known in the art. Suitable examples include lubricants; antistatic agents; UV stabilizers; plasticizers; surfactants;

nucleation agents; antioxidants; pigments; dyes; and adhesion promoters, such as a modified polypropylene having maleated reactive groups; and any combinations thereof, provided the viscosity remains within the desired range.

Glass Bubbles.

Many known hollow microspheres or bubbles, typically preferably glass, may be used. To improve survival of the bubbles during processing of the pellets so as to achieve the desired reduction in density, it is typically preferred to use high strength glass bubbles. In some instances, the vast majority (e.g. over 80%, preferably over 90% or even over 95% or 99%) of the bubbles should exhibit an isotactic crush strength of at least 3,000 PSI, preferably higher than 10,000 PSI, to withstand thermoplastic compounding and extrusion operations. In some embodiments, the glass bubbles will preferably exhibit high survivability when exposed to an isotactic crush strength of at least 18,000 PSI to withstand palletizing and injection molding as well as compounding and extrusion operations.

The strength of the glass bubbles is typically measured using ASTM D3102-72; "Hydrostatic Collapse Strength of Hollow Glass Microspheres". An illustrative example of such glass bubbles is 3M™ Scotchlite™ S60HS Glass Bubbles which are soda-lime-borosilicate glass and exhibit an isostatic crush strength of 18,000 psi, density of 0.60 g/cc, and average diameter of about 30 microns.

Preferably the glass bubbles (e.g. over 80%, preferably over 90% or even over 95% or 99% of the glass bubbles) are hollow, thin walled unicellular spheres. Preferably the glass bubbles are of borosilicate glass. The density (which is an average density over a plurality of glass bubbles) of said glass bubbles may vary and may for example be between 0.4 and 0.7 g/cm$^3$.

The glass bubbles suitable for use in the present invention preferably have a density of between 0.30 and 0.90 g/cm$^3$, preferably between 0.40 and 0.70 g/cm$^3$. The glass bubbles are preferably of borosilicate glass. The glass bubbles preferably have an average particle size of between 12 and 30 micrometer, preferably between 15 and 25 micrometer. The glass bubbles preferably have a isostatic pressure resistance of between 100 and 200 MPa. The glass bubbles preferably have a strength of 15000 to 40000 psi. The glass bubbles preferably have an average wall thickness of between 0.60 and 0.8 micron.

In a first embodiment of the glass bubbles (commercially available example being 3M iM16K glass bubbles) have a density of 0.46 g/cm$^3$ and are of borosilicate glass, they have an average particle size of 20 micrometer; an isostatic pressure resistance of 113 MPa; they have a strength of 16500 psi, an average wall thickness of 0.72 micron, 18% is glass and 82% is gas (void). The particle size distribution is as follows: 10% smaller than 13 micron; 50% smaller than 22 micron; and 90% smaller than 31 micron and the largest particles being 37 micron.

In a second embodiment of the glass bubbles (commercially available example being 3M iM30K glass bubbles have a density of 0.60 g/cm$^3$ and are of borosilicate glass; they have an average particle size of 16 micrometer; a isostatic pressure resistance of 193 MPa; they have a strength of 30000 psi, an average wall thickness of 0.70 micron, 24% is glass and 76% is gas (void). The particle size distribution is as follows: 10% smaller than 9 micron; 50% smaller than 16 micron; and 90% smaller than 25 micron and the largest particles being 29 micron.

The glass bubbles according to the present invention may be provided with an outside coating. The glass bubbles according to the present invention may have a modified surface, preferably wherein the surface is modified with an organic material, such as an aminosilane.

In a composite material, the hollow glass microsphere is usually stronger and stiffer than the surrounding polymer matrix; this combination gives the material (e.g. the polymeric sheath comprising polymer as well as secondary filler) its designed properties. In an embodiment, the polymer sheath (the matrix) comprises the hollow glass microspheres in an certain orderly and/or high-density pattern. In an embodiment, the plurality of hollow glass microspheres are dispersed throughout the matrix material so that they do not touch, in other words, the outside of said glass bubbles is covered by matrix material. In this way, the polymer matrix thus assists in distributing any applied load or stress among the hollow glass microspheres. In order to improve the mixing and filling of the hollow glass microsphere throughout the polymer matrix, a surface modification of the hollow glass microspheres may be carried out using a chemical reagent. Such a surface modification can assist in overcoming the forces preventing the polymer matrix from forming a substantially continuous phase of the material. A good mixing and optionally association of the optionally surface-treated microspheres allows tuning of the material properties, however careful processing and manufacture are also features that have an effect of the properties of the material. The surface chemical reagent is preferably an organic material; this material may provide an exterior coating on the particulate promoting the close association of polymer and particulate. Preferred amounts of the surface modifier are from about 0.005 to 8 wt. %, or from about 0.02 to 3 wt. %.

Hollow glass spheres are strong enough to avoid being crushed or broken during further processing of the polymeric compound, such as by high pressure spraying, kneading, extrusion or injection molding. In some embodiments, the microspheres have densities that are similar to that of the polymeric sheath into which they are introduced; this has the effect that they distribute evenly within the polymer upon introduction and mixing.

The glass bubbles used in the present invention may be hollow glass spheres as well as solid glass spheres which are both commercially available; most commercial grades of hollow glass sphere include a certain percentage (preferably less than 10 wt. %) of solid glass sphere that are not separated out prior to use. Preferably, the glass bubbles do not show significant expansion upon heating.

Nanoclay Particles

In an embodiment of the first aspect, said nanoclay particles preferably having a ratio between length and diameter of between 1 and 1000, more preferably between 10 and 800

In an embodiment of the first aspect, the nanoclay particles preferably having a length of between 0.1 and 10 micrometer, preferably 0.4 and 5 micrometer.

Fillers

In the process according to the invention a filler may be used. The filler preferably is a particulate filler, which may be of any configuration, for example spheres, plates, fibers, acicular, flakes, whiskers, or irregular shapes. Suitable fillers typically have an average longest dimension of about 1 nanometer to about 500 micrometers, specifically about 10 nanometers to about 100 micrometers. The average aspect ratio (length:diameter) of some fibrous, acicular, or whisker-shaped fillers (e.g., glass or wollastonite) may be about 1.5 to about 1000, although longer fibers are also within the scope of the invention. The mean aspect ratio (mean diameter of a circle of the same area: mean thickness) of plate-like fillers (e.g., mica, talc, or kaolin) may be greater than about 5, specifically about 10 to about 1000, more specifically about 10 to about 200. Bimodal, trimodal, or higher mixtures of aspect ratios may also be used.

The filler with a sphere, plate, acicular, flake or irregular shape preferably has a particle size of 0.01 to 10 μm, more preferably of 0.1 to 8 μm, most preferably of 0.1 to 5 μm. The particle size is expressed as the D50 of the particles. This means that 50 weight % of the particles has a size that falls within the above-mentioned ranges.

The fillers may be of natural or synthetic, mineral or non-mineral origin, provided that the fillers have sufficient thermal resistance to maintain their solid physical structure at least during the molding process. Suitable fillers may include clays, nanoclays, carbon black, wood flour either with or without oil, various forms of silica (precipitated or hydrated, fumed or pyrogenic, vitreous, fused or colloidal, including common sand), glass, metals, inorganic oxides (such as oxides of the metals in Periods 2, 3, 4, 5 and 6 of Groups Ib, Iib, IIIa, IIIb, IVa, IVb (except carbon), Va, VIa, VIIa and VIII of the Periodic Table), oxides of metals (such as aluminum oxide, titanium oxide, zirconium oxide, titanium dioxide, nanoscale titanium oxide, aluminum trihydrate, vanadium oxide, and magnesium oxide), hydroxides of aluminum or ammonium or magnesium, carbonates of alkali and alkaline earth metals (such as calcium carbonate, barium carbonate, and magnesium carbonate), antimony trioxide, calcium silicate, diatomaceous earth, fuller earth, kieselguhr, mica, talc, slate flour, volcanic ash, cotton flock, asbestos, kaolin, alkali and alkaline earth metal sulfates (such as sulfates of barium and calcium sulfate), titanium, zeolites, wollastonite, titanium boride, zinc borate, tungsten carbide, ferrites, molybdenum disulfide, asbestos, cristobalite, aluminosilicates including Vermiculite, Bentonite, montmorillonite, Na— montmorillonite, Ca— montmorillonite, hydrated sodium calcium aluminum magnesium silicate hydroxide, pyrophyllite, magnesium aluminum silicates, lithium aluminum silicates, zirconium silicates, and combinations comprising at least one of the foregoing fillers. Suitable fibrous fillers include glass fibers, basalt fibers, aramid fibers, carbon fibers, carbon nanofibers, carbon nanotubes, carbon buckyballs, ultra-high molecular weight polyethylene fibers, melamine fibers, polyamide fibers, cellulose fiber, metal fibers, potassium titanate whiskers, and aluminum borate whiskers.

Of these, calcium carbonate, talc, glass fibers, carbon fibers, magnesium carbonate, mica, silicon carbide, kaolin, wollastonite, calcium sulfate, barium sulfate, titanium, silica, carbon black, ammonium hydroxide, magnesium hydroxide, aluminum hydroxide, and combinations comprising at least one of the foregoing are preferred. More preferably, the filler is selected from talc or glass fibers (other than the fibers in the core of the pellets).

Optionally, the fillers may be surface modified, for example treated so as to improve the compatibility of the filler and the thermoplastic polymer which facilitates de-agglomeration and the uniform distribution of fillers into the polymers. Surface modification of fillers is known to the skilled person.

In the process according to the invention the pellet preferably comprises 1-40 wt. % of the filler based on the total weight of the pellet. The amount of the filler is at least 1 wt. %, preferably at least 2 wt. %, more preferably at least 4 wt. %. The amount of filler is at most 40 wt. %, preferably at most 35 wt. % and more preferably at most 30 wt. %.

Polymer for the Polymer Sheath

The polymer sheath is made of a thermoplastic polymer and comprises a plurality of filler particles. The polymer sheath may also comprise one or more additives. In an embodiment, the polymer sheath consists of at least one thermoplastic polymer, a plurality of filler particles and optionally one or more additives. The polymer of the sheath is preferably a thermoplastic polymer, more preferably a polypropylene homo- or copolymer. The thermoplastic polymer may be a single grade of polypropylene but may also be a mixture of at least two different polypropylene grades.

The sheath may further contain one or more common additives, for example stabilizers, processing aids, impact-modifiers, flame-retardants, acid scavengers, inorganic fillers, colorants, or components that further enhance properties of the fiber reinforced article, like compounds that enhance interfacial bonding between polymer and filaments. It is preferred that the thermoplastic polymer of the sheath comprises one or more of a functionalized polyolefin, like a maleated polypropylene. The amount of the functionalized polyolefin that is added is dependent on the reinforced article and is normally 0.1 to 4 wt. % with respect to the weight of the fibers in the multifilament, preferably 0.2 to 3 wt. %.

The amount of the thermoplastic polymer in the sheath of the pellets is preferably 15-94.5 wt. %, more preferably 20-90 wt. %, more preferably 25-80 wt. %, more preferably 30-70 wt. %, based on the total weight of the pellet.

The pellets according to the present invention may be used to prepare a reinforcing article. A reinforcing article is prepared using a molding composition. Said molding composition can be provided by the pellets according to the invention alone or may e.g. be obtained by mixing the pellets and one or more (non-reinforcing) fillers as separate components. Alternatively, the molding composition can be provided by providing the composition pellets according to the invention comprising the several fillers in the polymer sheath.

The filler may be added at different stages of the procedure. The filler may be added to the material during the production process as such or the filler may be added to the material during the production process in the form of a master batch. The filler may also be added separate from the pellet during injection molding.

The molding step may involve the steps of: ia) providing the pellets of the invention wherein a filler may be present; or ib) mixing the pellets of the invention and a filler to provide the molding composition; and ii) heating the molding composition to the elevated temperature. In this case, the filler can be added as such to the molding composition or the filler can be added in the form of a master batch comprising a polymer and a filler. This master batch of the filler can contain various types and amounts of filler and polymers. Mixtures of several fillers and/or polymers can be present in the master batch. The master batch can be provided to the process in the form of pellets. The polymer used in the master batch may be a polypropylene, like a propylene homopolymer, a random copolymer, or a so-called heterophasic copolymer of propylene and ethylene and/or another alpha-olefin. Most preferably, the thermoplastic polymer is polypropylene homo- or copolymer. The thermoplastic polymer as in the sheath of the pellets and the polymer in the master batch are preferably of the same type.

Mixing of the pellets and the filler can be performed in commonly used mixing devices to provide a molding composition wherein the pellet and the filler are homogeneously divided. Commonly used mixing devices are blenders, for example V blender, ribbon blender or a cone blender; mixers, for example a jet mixer, a planetary mixer or a Banbury mixer; or extruders. The molding composition can be heated before, during and/or after mixing of the molding composition. The polymers in the molding composition melt and form a matrix which is to be reinforced by the fibers.

Molding is performed at an elevated temperature, which is a temperature at which the molding composition has enough flowability to be molded (i.e. the polymers in the composition are melted). The elevated temperature is above the melting point of the thermoplastic polymer that is present in the sheath of the pellets. In the cases where a master batch comprising the filler and a polymer is used, the elevated temperature is also above the melting temperature of the polymer present in the master batch. The elevated temperature may be suitably chosen by the skilled person. Generally, the elevated temperature may e.g. be 150-500° C., 180-400° C. or 200-300° C. In the cases where the thermoplastic polymer in the pellet is a propylene homo- or co-polymer, the elevated temperature is preferably 200-300° C.

Suitable examples of molding processes include injection molding, compression molding, extrusion and extrusion compression molding. Injection molding is widely used to produce articles such as automotive exterior parts like bumpers, automotive interior parts like instrument panels, or automotive parts under the bonnet. Extrusion is widely used to produce articles such rods, sheets and pipes. Preferably, the molding involves injection molding in the process according to the invention. With the process according to the invention reinforced articles are made. Preferably the article is an automotive part. The reduced weight that the present invention allows for automotive parts with the same stiffness is very important because the automotive industry is always trying to decrease the weight of cars. The reinforced article according to the present invention may for example be a tailgate The thickness of the sheath of the pellet may vary around the perimeter of the pellet; preferably the variation in thickness around the perimeter of the pellet is maximally 200% of the maximum thickness, depending on the flatness of the pellet; the flatter the pellets the higher the variating in the thickness. The thickness—meaning the maximal thickness around the pellet—is preferably is at least 0.1 mm, more preferably at least 0.2 mm, most preferably at least 0.3 mm. The thickness of the sheath of thermoplastic polymer is preferably at most 2 mm, more preferably at most 1.5 mm, most preferably at most 1 mm. The thickness of the sheath is determined largely by the dimension of the glass multifilament and the desired amount of fibers in the pellet.

The length of the pellet preferably is between 10 to 50 mm, more preferably between 10-25 mm, most preferably between 10-20 mm. Preferably, the variation in the length of the pellet in view of the average length of a batch of pellets is between −10% and +10%. When in the description length of the pellet is disclosed, average length is meant unless specified otherwise.

It is further noted that the invention relates to all possible combinations of features described herein, preferred in particular are those combinations of features that are present in the claims.

It is also to be understood that a description on a product comprising certain components also discloses a product consisting of these components. Similarly, it is also to be understood that a description on a process comprising certain steps also discloses a process consisting of these steps. The invention will now be elucidated by way of the following examples without however being limited thereto.

The glass bubbles according to the present invention may comprise a surface coating. The coating may be bonded to the surface of the bubble or chemically react with the surface to modify or functionalize the surface. For example, bifunctional silane based coupling agents can be applied to the surface of glass bubbles. One end of the silane based molecule will bond to the glass bubble; the other end of the molecule can either bond to the polymer or associate with the polymer. This chemical bridge provides improved physical properties of the material—especially tensile, elongation and stiffness properties.

Clauses:

The following clauses provide aspects and embodiments of the present invention.

1. A pellet having an axial direction; said pellet comprising a core that extends in the axial direction and comprising a polymer sheath which has been applied around said core, wherein:
   said core comprises a plurality of filaments, preferably glass filaments, that extends in the axial direction;
   said polymer sheath is at least substantially free of said filaments;
   said polymer sheath comprising a plurality of filler particles;
   said pellet comprises at least 30%, preferably at least 35%, more preferably at least 40%, and preferably at most 60%, preferably at most 50%, of filaments by weight of the total weight of said pellet.

2. A pellet having an axial direction; said pellet comprising a core that extends in the axial direction and comprising a polymer sheath which has been applied around said core, wherein:
   said core comprises a plurality of filaments, preferably glass filaments, that extends in the axial direction;
   said polymer sheath is at least substantially free of said filaments;
   said polymer sheath comprising a plurality of reinforcing filler particles;
   said pellet comprises at least 30%, preferably at least 35%, more preferably at least 40%, and preferably at most 60%, preferably at most 50%, of filaments by weight of the total weight of said pellet.

3. A pellet having an axial direction; said pellet comprising a core that extends in the axial direction and comprising a polymer sheath which has been applied around said core, wherein:
   said core comprises a plurality of filaments, preferably glass filaments, that extends in the axial direction;
   said polymer sheath is at least substantially free of said filaments;
   said polymer sheath comprising a plurality of light weight filler particles;
   said pellet comprises at least 30%, preferably at least 35%, more preferably at least 40%, and preferably at most 60%, preferably at most 50%, of filaments by weight of the total weight of said pellet.

4. A pellet having an axial direction; said pellet comprising a core that extends in the axial direction and comprising a polymer sheath which has been applied around said core, wherein:
   said core comprises a plurality of glass filaments, that extends in the axial direction;
   said polymer sheath comprising less than 5 wt. %, preferably less than 2 wt. %, of said filaments based on the total weight of the polymer sheath; and said polymer sheath comprising a plurality of filler particles, being a combination of glass bubbles and nanoclay particles in a ratio of between 0.5 to 2.0 of glass bubbles to nanoclay particles;
   said pellet comprises at least 40 wt. % and at most 50 wt. %, of filaments based on the total weight of said pellet.

5. A pellet having an axial direction; said pellet comprising a core that extends in the axial direction and comprising a polymer sheath which has been applied around said core, wherein:
   said core comprises a plurality of glass filaments, that extends in the axial direction;

said polymer sheath comprising less than 5 wt. %, preferably less than 2 wt. % of said filaments based on the total weight of the polymer sheath; and said polymer sheath comprising a plurality of filler particles, being a combination of glass bubbles and nanoclay particles in a ratio of between 0.5 to 2.0 of glass bubbles to nanoclay particles; wherein the amount of filler particles is between 5 and 10 wt. % on basis of the total weight of the pellet;

said pellet comprises at least 40 wt. % and at most 50 wt. %, of filaments based on the total weight of said pellet.

6. A pellet having an axial direction; said pellet comprising a core that extends in the axial direction and comprising a polymer sheath which has been applied around said core, wherein:

said core comprises from 2000 to 5000 glass filaments, that extends in the axial direction wherein said filaments having a diameter from 15 to 25 microns;

said polymer sheath comprising less than 5 wt. %, preferably less than 2 wt. % of said filaments based on the total weight of the polymer sheath; and said polymer sheath comprising a plurality of filler particles, being a combination of glass bubbles and nanoclay particles in a ratio of between 0.5 to 2.0 of glass bubbles to nanoclay particles; wherein the amount of filler particles is between 5 and 10 wt. % on basis of the total weight of the pellet;

said pellet comprises at least 40 wt. % and at most 50 wt. %, of filaments based on the total weight of said pellet.

7. A pellet having an axial direction; said pellet comprising a core that extends in the axial direction and comprising a polymer sheath which has been applied around said core, wherein:

said core comprises from 2000 to 5000 glass filaments, that extends in the axial direction wherein said filaments having a diameter from 15 to 25 microns;

said polymer sheath comprising less than 5 wt. %, preferably less than 2 wt. % of said filaments based on the total weight of the polymer sheath; and said polymer sheath comprising a plurality of filler particles, being a combination of glass bubbles and nanoclay particles in a ratio of between 0.5 to 2.0 of glass bubbles to nanoclay particles; wherein the amount of filler particles is between 5 and 10 wt. % on basis of the total weight of the pellet; said polymer sheath being a polypropylene homopolymer having a melt flow index (MFI) that is in the range of 40 to 80 g/10 min;

said pellet comprises at least 40 wt. % and at most 50 wt. %, of filaments based on the total weight of said pellet.

8. A pellet having an axial direction; said pellet comprising a core that extends in the axial direction and comprising a polymer sheath which has been applied around said core, wherein:

said core having a radius of between 800 and 4000 micrometer and comprising from 2000 to 5000 glass filaments, that extends in the axial direction wherein said filaments having a diameter from 15 to 25 microns;

said polymer sheath having a thickness of between 500 and 1500 micrometer and comprising less than 5 wt. %, preferably less than 2 wt. % of said filaments based on the total weight of the polymer sheath; and said polymer sheath comprising a plurality of filler particles, being a combination of glass bubbles and nanoclay particles in a ratio of between 0.5 to 2.0 of glass bubbles to nanoclay particles; wherein the amount of filler particles is between 5 and 10 wt. % on basis of the total weight of the pellet; said polymer sheath being a polypropylene homopolymer having a melt flow index (MFI) that is in the range of 40 to 80 g/10 min;

said pellet comprises at least 40 wt. % and at most 50 wt. %, of filaments based on the total weight of said pellet.

9. A pellet having an axial direction; said pellet comprising a core that extends in the axial direction and comprising a polymer sheath which has been applied around said core, wherein:

said core having a radius of between 800 and 4000 micrometer and comprising from 2000 to 5000 glass filaments, that extends in the axial direction wherein said filaments having a diameter from 15 to 25 microns;

said polymer sheath having a thickness of between 500 and 1500 micrometer and comprising less than 5 wt. %, preferably less than 2 wt. % of said filaments based on the total weight of the polymer sheath; and said polymer sheath comprising a plurality of filler particles, being a combination of glass bubbles and nanoclay particles in a ratio of between 0.5 to 2.0 of glass bubbles to nanoclay particles; wherein the amount of filler particles is between 5 and 10 wt. % on basis of the total weight of the pellet; said polymer sheath being a polypropylene homopolymer having a melt flow index (MFI) that is in the range of 40 to 80 g/10 min;

said pellet comprises at least 40 wt. % and at most 50 wt. %, of filaments based on the total weight of said pellet;

wherein the core comprises between 35 and 60% of the cross section area of the pellet and wherein the sheath comprises between 40 and 65% of the cross section area of the pellet.

10. A pellet having an axial direction; said pellet comprising a core that extends in the axial direction and comprising a polymer sheath which has been applied around said core, wherein:

said core having a radius of between 800 and 4000 micrometer and comprising from 2000 to 5000 glass filaments, that extends in the axial direction wherein said filaments having a diameter from 15 to 25 microns;

said polymer sheath having a thickness of between 500 and 1500 micrometer and comprising less than 5 wt. %, preferably less than 2 wt. % of said filaments based on the total weight of the polymer sheath; and said polymer sheath comprising a plurality of filler particles, being a combination of glass bubbles having a glass bubble breakage of at most 23% and having an average diameter of between 15 and 25 micrometer and nanoclay particles in a ratio of between 0.5 to 2.0 of glass bubbles to nanoclay particles; wherein the amount of filler particles is between 5 and 10 wt. % on basis of the total weight of the pellet; said polymer sheath being a polypropylene homopolymer having a melt flow index (MFI) that is in the range of 40 to 80 g/10 min and the amount of polymer in the pellet being between 40 and 80 wt. % of the total weight of the pellet;

said pellet comprises at least 40 wt. % and at most 50 wt. %, of filaments based on the total weight of said pellet;

wherein the core comprises between 35 and 60% of the cross section area of the pellet and wherein the sheath comprises between 40 and 65% of the cross section area of the pellet.

11. A pellet having an axial direction; said pellet comprising a core that extends in the axial direction and comprising a polymer sheath which has been applied around said core, wherein:

said core comprises a plurality of glass filaments, that extends in the axial direction;

said polymer sheath comprising less than 5 wt. %, preferably less than 2 wt. %, of said filaments based on the total weight of the polymer sheath; and said polymer sheath comprising a plurality of filler particles, being a combination of glass bubbles and nanoclay particles in a ratio of between 0.5 to 2.0 of glass bubbles to nanoclay particles;

said pellet comprises at least 40 wt. % and at most 50 wt. %, of filaments based on the total weight of said pellet;

wherein the exposed ratio, being the number of filaments that is observed at the cutting edge of the pellet divided by the total number of filaments times 100%, is at least 95%.

12. A pellet having an axial direction; said pellet comprising a core that extends in the axial direction and comprising a polymer sheath which has been applied around said core, wherein:

said core having a radius of between 800 and 4000 micrometer and comprising from 2000 to 5000 glass filaments, that extends in the axial direction wherein said filaments having a diameter from 15 to 25 microns;

said polymer sheath having a thickness of between 500 and 1500 micrometer and comprising less than 5 wt. %, preferably less than 2 wt. % of said filaments based on the total weight of the polymer sheath; and said polymer sheath comprising a plurality of filler particles, being a combination of glass bubbles having a glass bubble breakage of at most 23 and having an average diameter of between 15 and 25 micrometer and nanoclay particles in a ratio of between 0.5 to 2.0 of glass bubbles to nanoclay particles; wherein the amount of filler particles is between 5 and 10 wt. % on basis of the total weight of the pellet; said polymer sheath being a polypropylene homopolymer having a melt flow index (MFI) that is in the range of 40 to 80 g/10 min and the amount of polymer in the pellet being between 40 and 80 wt. % of the total weight of the pellet;

said pellet comprises at least 40 wt. % and at most 50 wt. %, of filaments based on the total weight of said pellet;

wherein the core comprises between 35 and 60% of the cross section area of the pellet and wherein the sheath comprises between 40 and 65% of the cross section area of the pellet;

wherein the exposed ratio, being the number of filaments that is observed at the cutting edge of the pellet divided by the total number of filaments times 100%, is at least 95%.

EXAMPLES

Materials:

As polyolefin a homopropylene was used having a MFR of 47 g/10 min @ 230C/2.16 kg. As filaments a glass roving impregnated by an impregnating composition (sizing) having a diameter of 19 micrometer and a tex of 3000 was used (Advantex SE4220 produced by 3B). As fillers glass bubbles having an average diameter of either 16 or 30 micron was used without surface coating (e.g. iM16 k or iM30 k from 3M) having a surface area of 210 m$^2$/g (measured according to ASTMD3663-84), a density of 0.45 g/cm$^3$ for iM16K and a density of 0.6 g/cm$^3$ for iM30K (measured according to ASTM D792-13). or nanoclay (Adins NC (not-silane modified) and Adins 80T (silane modified) from Tolsa), which is a (silane-modified) sepiolite clay having a specific gravity of 2 g/cm$^3$ (ISO 787-10:1993), having a density of 0.13 g/cm$^3$ (NET 005-03), having a surface area (BET) of 210 m$^2$/g (NET-069-03; ASTM D3663-84); having a d90 of 24 micrometer and having a d50 of 7 micrometer and >99.9% of the particles having a diameter of less than or equal to 45 micrometer. As additives are added: a (UV) stabilizer (Irganox B225), a coupling agent (Exxelor P01020) and an impregnating agent/wax which is a low Mw hydrocarbon (Parafflex 4843A).

Testing Methods

The samples used for testing are prepared using injection molding. The pellets were manufactured in accordance with the method disclosed in WO2009/080281 where the pre-compound containing second filler is used as the polyolefin sheath. The pre-compound is prepared using conventional compounding with extrusion. The samples produced for testing are prepared using injection molding.

Tensile test The tensile modulus and tensile strength were tested according to ISO 527-2(1A) (2012) at 23° C., 80° C., and 120° C. Elongation at break was tested according to ISO 527-2(1A) (2012) at 23° C. Tensile bar produced by injection molding according to ISO 527-2(1A) (2012) with dimension 150*10*4 mm. The specimens were conditioned for 7 days at 23±1° C. and at relative humidity of 50±5% before testing.

Isotropic modulus or tensile modulus: Isotropic modulus was tested according to Tensile ISO 527-2(1B) (2012) at 23° C. Isotropic plaques have dimension of 270*310*3 mm where 3 specimens with dimension 150*10*4 mm were cut at 0°, 45° and 90° to the direction of flow during injection molding. The specimens were conditioned for 7 days at 23±1° C. and at relative humidity of 50±5% before testing.

Density: Density was measured according to ISO 1183: 1-2012 (method A) at 23° C. and specimens were conditioned for 7 days at 23±1° C. and at relative humidity of 50±5% before testing.

Falling Dart Impact (FDI)/Break force: FDI was tested according to ISO 6603-2:2000 at 23° C. and −30° C. Specimen dimension was 65*65*3 mm and the dart diameter and weight are 20 mm and 20 kg accordingly. The specimens were conditioned for 7 days at 23±1° C. and at relative humidity of 50±5% before testing. Charpy Impact strength: Impact strength was tested according to ISO179: 1-2010 at 23° C. and −30° C. Specimen dimension was 80*10*4 mm and specimens were conditioned for 72 hr at 23±1° C. and at relative humidity of 50±5% before testing. Due to the small size of the bars the fibers are most likely unidirectional. Both notched and un-notched tests were carried out.

Fiber Length: The fiber length of the filament in the reinforced article was measured according to a custom STAMAXTAT test on an injection molded specimen of 6*6*3 mm and the calcination occurs at T=600° C. After injection molding the amount of glass breakage is determined as a number average (Ln) and a weight average (Lw). This number should remain as high as possible, a decrease will lead to a decrease in the modulus.

Bubble breakage: Bubble breakage is calculated according to the following formula:

$$\text{bubble breackage} (\%) = 1 - \frac{(\rho_m \rho_B - w_m \rho_B \rho_c)/\rho_c \rho_m}{w_R}$$

$\rho_m$=matrix density
$\rho_B$=glass bubble density
$w_m$=weight fraction matrix
$w_R$=weight fraction bubbles (ash)
$\rho_c$=measured matrix density wherein the parameters are determined by the densities are measured using ASTM D792-13 method, weight fraction of bubbles measured by ash content measurement (ASTM D2584-11).

Comparative A

A first comparative pellet A is used comprising 40.00% (40%) glass fiber filament forming the core and further comprising a polymer sheath comprising 54.03% homopropylene based on the total weight of the pellet. The composition lacks a filler. The polymer sheath further containing 0.45% stabilizer, 2.00% coupling agent and 3.52% wax based on the total weight of the pellet. The density of the pellet was measured to be 1.22 g/cm³. The isotropic and effective isotropic modulus were determined to be 4850 MPa and 3.97 (m/s)², respectively. The isotropic tensile strength was determined to be 64.3 MPa. The Charpy impact strength was tested both notched and un-notched both at 23° C. and −30° C.; the notched impact strength was 20.32 KJ/m² and 27.76 KJ/m², at 23° C. and −30° C. respectively and the un-notched the values were 49.43 KJ/m² and 49.5 KJ/m², at 23° C. and −30° C. respectively. The FDI break force was determined to be 2245 N and 2184 N, at 23° C. and −30° C. respectively. The glass fiber filament in the object have a Lw fiber length of 2.38 mm.

Comparative B A second comparative pellet B is used comprising 50.00% (50%) glass fiber filament forming the core and further comprising a polymer sheath comprising 42.74% homopropylene based on the total weight of the pellet. The composition lacks a filler. The polymer sheath further containing 0.36% stabilizer, 2.50% coupling agent and 4.40% wax based on the total weight of the pellet. The density of the pellet was measured to be 1.32 g/cm³. The isotropic and effective isotropic modulus were determined to be 6040 MPa and 4.56 (m/s)², respectively. The isotropic tensile strength was determined to be 67.8 MPa. The FDI break force was determined to be 2292 N and 2525 N, at 23° C. and −30° C. respectively. In the formed object the Lw fiber length was 2.08 mm.

Example 1

A first pellet according to the present invention was used comprising 36.00% (36%) glass fiber forming the core and further comprising a polymer sheath comprising 50.20% homopolypropylene, 8.00% of iM16 k glass bubbles as a filler, further containing 0.43% stabilizer, 2.20% coupling agent, 3.17% wax based on the total weight of the pellet. The density of the pellet according to Example 1 was measured to be 1.11 g/cm³. The isotropic and effective isotropic modulus were determined to be 4400 MPa and 3.96(m/s)², respectively. Isotropic tensile strength was determined to be 68.0 MPa. The bubble breakage percentage as determined by the formula above 22.5%. The Charpy impact strength was tested both notched and un-notched at 23° C. and −30° C. Notched the impact strength was 22.5 KJ/m² and 27.0 KJ/m², at 23° C. and −30° C. respectively. Un-notched the values are 57.7 KJ/m² and 45.8 KJ/m², at 23° C. and −30° C. respectively. FDI break force was determined to be 2110 N and 2304 N, at 23° C. and −30° C. respectively. The average number of white spots was determined to be 10.9; which is less than the comparative example A above being 14.7. In the object the Lw fiber length was 2.10 mm.

Example 2

A second pellet according to the present invention was used comprising 40.00% (40%) glass fiber forming the core and having a polymer sheath comprising 48.86% polyolefin, a filler in the form of nanoclay Adins 80T (described above) at 5.00%, further containing 0.37% stabilizer, 2.25% coupling agent, and 3.52% wax based on the total weight of the pellet. The density of the pellet of example 2 was determined to be 1.28 g/cm³. The isotropic and effective isotropic modulus was determined at 5768 MPa and 4.51 (m/s)², respectively. Isotropic tensile strength was determined to be 70.4 MPa. The Charpy impact strength was tested both notched and un-notched both at 23° C. and −30° C. Notched the impact strength was 18.6 KJ/m² and 22.1 KJ/m², at 23° C. and −30° C. respectively. Un-notched the values are 61.7 KJ/m² and 52.3 KJ/m², at 23° C. and −30° C. respectively. FDI break force was determined to be 2098 N and 2170 N, at 23° C. and −30° C. respectively. In the object, the Lw fiber length was 2.10 mm.

Example 3

A third pellet according to the present invention was used 50.00% (50%) glass fiber as the core and further comprising a polymer sheath comprising 37.42% homopropylene, a filler in the form of iM16K glass bubbles at 5.10%, further containing 0.33% stabilizer, 2.75% coupling agent, 4.40% wax based of the total weight of the pellet. The density of the pellet of example 3, was determined to be 1.28 g/cm³. The isotropic and effective isotropic modulus was determined at 6190 MPa and 4.84(m/s)², respectively. Isotropic tensile strength was determined to be 57.8 MPa. The bubble breakage percentage as determined by the formula above 20%. FDI break force was determined to be 2228 N and 2254 N, at 23° C. and −30° C. respectively. In the object, the fiber length Lw was 2.17 mm.

Example 4

A fourth pellet according to the present invention was used comprising 50.00% (50%) glass fiber as the core and further comprising a polymer sheath comprising 35.64% homopropylene, a filler in the form of iMK16 k glass bubbles at 6.80%, further containing 0.32% stabilizer, 2.84% coupling agent, 4.40% wax based of the total weight of the pellet. The density of the pellet of example 4, was determined to be 1.25 g/cm³. The isotropic and effective isotropic modulus was determined at 6335 MPa and 5.10 (m/s)², respectively. Isotropic tensile strength was determined to be 62.2 MPa. The bubble breakage percentage as determined by the formula above 17.5%. FDI break force was determined at the above mentioned temperatures and measured to be 2164 N and 2269 N, at 23° C. and −30° C. respectively. In the object the Lw fiber length was 2.08 mm.

Example 5

A fifth pellet according to the present invention is used 40.00% (40%) glass fiber and further comprising a polymer sheath comprising 44.4% homopropylene, a filler in the form of iM16K glass bubbles at 4.00%, a second filler in form of nanoclay Adins NC (described above) at 5.00%, further containing 0.33% stabilizer, 2.75% coupling agent, 3.52% wax based of the total weight of the pellet. The density of the pellet of example 5, is determined to be 1.22 g/cm³. The isotropic and effective isotropic modulus is determined at 6000 MPa and 4.92(m/s)², respectively. Isotropic tensile strength is determined to be 57.8 MPa. The bubble breakage percentage as determined by the formula above 20%. FDI break force is determined to be 2228 N and 2254 N, at 23° C. and −30° C. respectively.

Example 6

A sixth pellet according to the present invention is used 45.00% (45%) glass fiber and further comprising a polymer sheath comprising 41.92% homopropylene, a filler in the form of iM16K glass bubbles at 6.00%, further containing 0.33% stabilizer, 2.75% coupling agent, 4% wax based of the total weight of the pellet. The density of the pellet of example 6 is determined to be 1.20 g/cm$^3$. The isotropic and effective isotropic modulus is determined at 6000 MPa and 4.98 (m/s)$^2$, respectively. Isotropic tensile strength is determined to be 58.6 MPa. The bubble breakage percentage as determined by the formula below 10%. FDI break force is determined to be 1901 N at 23° C. Table 1 below summarizes the composition of the pellets according to the invention and the comparative pellets. Table 2 below summarizes the characteristics of these pellets.

strength. It was observed that the FDI break force value was somewhat lower for the examples using glass bubbles. This might be due to the fact that there is significantly more glass present and this might lead to a bit more glass breakage, even though this is minimized by the use of high strength glass bubbles. With the use of the fillers according to the present invention, a significant improvement is observed in the isotropic modulus test (comparative B is compared to examples 3 and 4 and comparative A is compared to Example 2). The same is true for the effective isotropic modulus, being the ratio of isotropic modulus over density, which is increased significantly.

By tuning the amount of glass filament and the amount of filler, the characteristics may be tuned. When comparing Example 1 (36% glass filament/8% glass bubbles) with Example 6 (45% glass filament/6% glass bubbles) it can be observed that the density increases somewhat from 1.11 to 1.20, the isotropic modulus sharply increases from 4400 to 6000 MPA.

TABLE 1 composition of pellet (% in wt. % based on the total weight of the pellet)

| Example | % glass filament | % of polymer | % Filler bubbles | % filler nanoclay | % stabilizer | % Coupling agent | % wax |
|---|---|---|---|---|---|---|---|
| CE A | 40.00 | 54.03 | 0.00 | 0.00 | 0.45 | 2.00 | 3.52 |
| CE B | 50.00 | 42.74 | 0.00 | 0.00 | 0.36 | 2.50 | 4.40 |
| Ex 1 | 36.00 | 50.20 | 8.00 | 0.00 | 0.43 | 2.20 | 3.17 |
| Ex 2 | 40.00 | 48.86 | 0.00 | 5.00 | 0.37 | 2.25 | 3.52 |
| Ex 3 | 50.00 | 37.42 | 5.10 | 0.00 | 0.33 | 2.75 | 4.40 |
| Ex 4 | 50.00 | 35.64 | 6.80 | 0.00 | 0.32 | 2.84 | 4.40 |
| Ex 5 | 40.00 | 44.4 | 4.00 | 5.00 | 0.33 | 2.75 | 3.52 |
| Ex 6 | 45.00 | 41.92 | 6.00 | 0.00 | 0.33 | 2.75 | 4.00 |

TABLE 2 characteristics of pellets

| Ex. | Density [g/cm$^3$] | Isotropic modulus [MPa] | Effective isotropic modulus [(m/s)$^2$] | Isotropic strength [MPa] | Charpy at 23° C. Notched (unnotched) [KJ/m$^2$] | Charpy at −30° C. Notched (unnotched) [KJ/m$^2$] | FDI break force At 23° C. (−30° C.) [N] | White spots [no unit] | Lw fiber length [mm] |
|---|---|---|---|---|---|---|---|---|---|
| CE A | 1.22 | 4850 | 3.97 | 64.3 | 20.32 (49.43) | 27.76 (49.5) | 2245 (2184) | 14.7 | 2.38 |
| CE B | 1.32 | 6040 | 4.56 | 67.8 | n.d. | n.d. | 2292 (2525) | n.d | 2.08 |
| Ex 1 | 1.11 | 4400 | 3.96 | 68.0 | 22.5 (57.7) | 27.0 (45.8) | 2110 (2304) | 10.9 | 2.10 |
| Ex 2 | 1.28 | 5768 | 4.51 | 70.4 | 18.6 (61.7) | 22.1 (52.3) | 2098 (2170) | 9 | 2.10 |
| Ex 3 | 1.28 | 6190 | 4.84 | 57.8 | n.d. | n.d. | 2228 (2254) | n.d. | 2.17 |
| Ex 4 | 1.25 | 6335 | 5.10 | 62.2 | n.d. | n.d. | 2164 (2269) | 8.2 | 2.08 |
| Ex 5 | 1.22 | 6000 | 4.92 | 57.8 | n.d. | n.d. | 2228 (2254) | 9.5 | n.d. |
| Ex 6 | 1.20 | 6000 | 4.98 | 58.6 | n.d. | n.d. | 1901 (n.d.) | 10.1 | n.d. | n.d. = not determined

There is a significant effect of the addition of fillers (Example 3 compared to comparative example B) on the density, which is reduced. There is no significant effect of the addition of fillers (Examples 1-4 compared to comparative examples A and B) on the Charpy (un)notched impact

The invention claimed is:
1. A pellet having an axial direction; said pellet comprising a core that extends in the axial direction and comprising a polymer sheath which has been applied around said core, wherein:

said core comprises a plurality of filaments that extends in the axial direction;

said polymer sheath is at least substantially free of said filaments;

said polymer sheath comprising a plurality of filler particles; wherein the filler particles are glass bubbles, nanoclay particles or a combination thereof, said pellet comprises at least 30% of filaments by weight of the total weight of said pellet, wherein said pellet has a density of greater than 0 to 1.3 g/cm³ and an effective isotropic modulus of between 4 and 6 (m/s)².

2. The pellet according to claim 1, wherein the filler particles are a combination of glass bubbles and nanoclay particles.

3. The pellet according to claim 1, wherein said pellet comprises between 3 and 20 wt. % of said filler particles on basis of the total weight of the pellet.

4. The pellet according to claim 1, wherein said core comprises from 2000 to 5000 filaments and/or wherein said filaments having a diameter from 5 to 50 microns.

5. The pellet according to claim 1, wherein said polymer sheath is a polyolefin.

6. The pellet according to claim 1, wherein the radius of the core is between 800 and 4000 micrometer and/or wherein the thickness of the polymer sheath is between 500 and 1500 micrometer.

7. The pellet according to claim 1, wherein the core comprises between 35 and 60% of the cross section area of the pellet and wherein the sheath comprises between 40 and 65% of the cross section area of the pellet.

8. The pellet according to claim 1, wherein the polymer sheath comprises less than 2 wt. % of filament based on the total weight of the polymer sheath.

9. The pellet according to claim 1, wherein the filler particles are glass bubbles and wherein the glass bubble breakage is at most 30%.

10. The pellet according to claim 1, wherein the filler particles are glass bubbles and wherein the glass bubbles have an average diameter of between 10 and 30 micrometer.

11. The pellet according to claim 1, wherein the amount of polymer in the pellet is between 40 and 80 wt. % of the total weight of the pellet.

12. The pellet according to claim 1, wherein the exposed ratio, being the number of filaments that is observed at the cutting edge of the pellet divided by the total number of filaments times 100%, is at least 95%.

13. A reinforced article obtained from molding a plurality of said pellets according to claim 1.

14. A method of making a pellet comprising:
i) unwinding from a package of a plurality of continuous filaments;
ii) optionally applying a impregnating composition to said plurality of filaments to form an impregnated plurality of filaments;
iii) providing a polymer composition comprising at least one polymer and a plurality of filler particles wherein the filler particles are glass bubbles, nanoclay particles or a combination thereof,
iv) applying a sheath of polymer comprising filler particles around the impregnated plurality of continuous filaments to form a sheathed bundle comprising a core comprising said plurality of filaments and comprising a sheath comprising said polymer and filler particles: and
v) cutting the sheathed bundle into individual pellets comprising a core that extends in the axial direction and comprising a polymer sheath which has been applied around said core, wherein:
said core comprises a plurality of filaments that extends in the axial direction;
said pellet comprises at least 30% of filament by weight of the total weight of said pellet;
said polymer sheath is at least substantially free of filaments;
said polymer sheath comprising a plurality of filler particles,
wherein said pellet has a density of greater than 0 to 1.3 g/cm³ and an effective isotropic modulus of between 4 and 6 (m/s)².

15. The pellet according to claim 1, wherein said polymer sheath comprises less than 5 wt. % of said filaments based on the total weight of the polymer sheath.

16. The pellet according to claim 2, wherein a ratio of glass bubbles to nanoclay particles is between 0.5 to 2.0.

17. The pellet according to claim 5, wherein said polyolefin is a polypropylene homopolymer.

18. The pellet according to claim 17, wherein said polypropylene homopolymer has a melt flow index (MFI) that is at least 20 g/10 min and/or having a MFI that is greater than 0 to 150 g/10 min.

19. The reinforced article according to claim 13, said article being an automotive part.

20. The reinforced article according to claim 13, said article being a tailgate.

21. The pellet according to claim 1, wherein said pellet has an effective isotropic modulus of between 4.5 and 5.5 (m/s)².

* * * * *